June 6, 1972    T. J. SOTOLONGO    3,667,783
LIQUID TIGHT STRAIN RELIEF CONNECTOR
Filed July 8, 1970

INVENTOR.
THOMAS J. SOTOLONGO
BY David Sealine
ATTORNEY

3,667,783
LIQUID TIGHT STRAIN RELIEF CONNECTOR
Thomas J. Sotolongo, Red Bank, N.J., assignor to Thomas
& Betts Corporation, Elizabeth, N.J.
Filed July 8, 1970, Ser. No. 53,169
Int. Cl. H02g 3/18; F16l 41/00
U.S. Cl. 285—161                              7 Claims

ABSTRACT OF THE DISCLOSURE

A connector for coupling an electrical conductor to an electrical enclosure providing a liquid tight coupling against moisture and providing strain relief for the conductor. The connector consists of a body member suitably threaded to receive a fastening means for fastening the connector to the electrical enclosure and also for receiving thereupon a gland nut for assembling the overall connector. The transverse passage of the body member is outwardly tapered at a first end for receipt therein of a complementary tapered deformable bushing providing a moisture seal within the connector. In contact with the bushing and housed within a gland nut having an inwardly tapered longitudinal passage is a segmented conductor gripping means having a surface configuration complementary to the inward taper of the gland nut. When assembled the interaction of the body member, gland nut, bushing and conductor grip means is to force the segments of the conductor grip means inwardly securely gripping the conductor to provide strain relief and to further provide for the deformation of the bushing to provide desired moisture sealing within the connector.

BACKGROUND OF THE INVENTION

Field of the invention

The invention finds utility principally in the field of connecting electrical conductors to electrical enclosures such as boxes or the like. It can also be employed to provide a strain relief, liquid tight connection between two or more conductors providing suitable additional adapters are employed.

Description of the prior art

Prior art connectors generally provided either of the two features of the instant invention but not both. Generally they provided either moisture sealing by means of a deformable ferrule or bushing within the body which bushing in addition to being deformed so that it could not be removed also deformed the conductor preventing reusability of both the conductor and the connector. Alternatively, if it was desired to provide strain relief then a strain relief type of grommet, or device, would be employed with the connector but such strain relief due to its usual split construction provided no moisture barrier to prevent moisture from entering the electrical enclosure. In some instances it was possible to provide as two discrete elements, moisture sealing by employing a deformable ferrule or bushing within the connector and strain relief by providing a strain relief device totally external to the connector. Such devices were cumbersome to use and did not provide a satisfactory junction between the electrical conductor and the electrical enclosure.

SUMMARY OF THE INVENTION

The present invention overcomes the difficulties noted above with respect to prior art devices by providing a connector for connecting an electrical conductor to an electrical enclosure which provides both moisture sealing and strain relief for the conductor. This is achieved by means of a novel four piece connector which when assembled provides, totally within the connector itself, moisture sealing and strain relief. The first element of the connector is the body member having a first externally threaded portion for placement through the knockout of an electrical enclosure and for the receipt thereupon of a fastening device such as a nut to affix the connector to the electrical enclosure. At the opposite end is a second externally threaded portion for receipt thereon of an internally threaded portion of a gland nut. Intermediate the two externally threaded portions is a series of wrench flats to permit the tightening of the body member to the electrical enclosure. The longitudinal passage through the body member has an outwardly tapered entrance such as to receive the complementary tapered portion of a deformable bushing. The overall assembly of a connector will forcefully position the tapered portion of the bushing within the tapered entry to the body member thereby assuring a moisture tight seal within the connector. The gland nut has an externally knurled surface to permit the installation of its internally threaded portion over the externally threaded portion of the body member. The longitudinal passage through the gland nut is inwardly tapered at its end remote from the internally threaded portion and receives the complementary tapered segments of a conductor gripping means positioned within the gland nut. When assembled, the rear surface of the bushing will engage with a surface of the segments of conductor gripping means forcing them against the inwardly tapered portion of the gland nut to engage the conductor passed through the connector. It is therefore an object of this invention to provide an improved connector for coupling an electrical conductor to an electrical enclosure.

It is another object of this invention to provide an improved electrical connector providing both strain relief and a moisture seal for a conductor placed therethrough.

It is another object of this invention to provide an improved electrical connector having a conductor gripping means for strain relief which grasps a conductor as the overall connector is assembled.

It is yet another object of this invention to provide an electrical connector wherein the operating mechanism within the connector for applying strain relief to a conductor passing therethrough also provides the moisture sealing of the connector.

It is yet another object of this invention to provide an improved electrical connector having a conductor gripping means of a plurality of gripping segments at least some of which are coupled by means of webs whereby the gripping action of the gripping device may be equally applied about the periphery of the conductor.

It is still another object of this invention to provide an improved electrical connector wherein the conductor gripping means acts to engage the electrical conductor when the connector is assembled and disengages itself from the conductor when the connector is disassembled.

It is yet another object of this invention to provide an improved electrical connector providing moisture sealing and strain relief wherein both the moisture sealing member and the strain relief member are recoverable without damage thereto or damage to the conductor passed therethrough upon disassembly of the overall connector.

Other objects and features of the invention will be pointed out in the following description and claims and illustrated in the accompanying drawings, which disclose, by way of example, the principles of the invention and the best modes which have been contemplated for carrying them out.

BRIEF DESCRIPTION OF THE DRAWINGS

Similar elements will be given similar reference characters in each of the respective figures.

DESCRIPTION OF THE PREFERRED EMBODIMENTS

Figure 1:
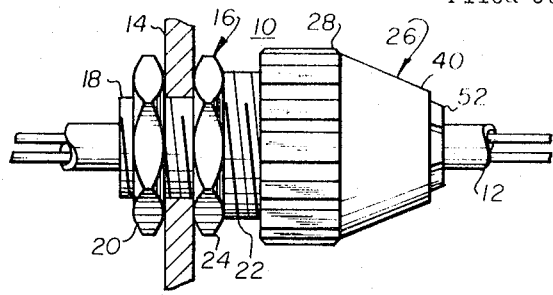
FIG 1 is a side elevation of a connector constructed in accordance with the concepts of the invention and shown assembled to a portion of an electrical conductor passing therethrough and to the wall of an electrical enclosure.

Turning now to FIG. 1 there is shown a connector 10 constructed in accordance with the concepts of the invention for providing a strain relief, moisture tight seal between an electrical conductor 12 and the wall 14 of an electrical enclosure. A body member 16 has a first externally threaded portion 18 for passage through a knockout in the wall 14 of an electrical enclosure and for receipt thereon of a threaded fastener such as the nut 20. A second externally threaded portion 22 is provided for assembly to a gland nut as will be described below. Intermediate the first externally threaded portion 18 and the second externally threaded portion 22 are a series of wrench flats 24 to aid in the assembly of the body member 16 to the wall 14 of the electrical enclosure and the gland nut to the body member 16. Gland nut 26 has an internally threaded portion (not visible in FIG. 1) below its externally knurled portion 28. The externally knurled portion 28 is provided to permit hand assembly of the gland nut 26 to the body member 16. Beyond the knurled portion 28 is an inwardly tapered portion 40. Extending from within the longitudinal aperture of the gland nut 26 are the ends of the segments of the conductor gripping means as will be described below in greater detail.

Figure 2:
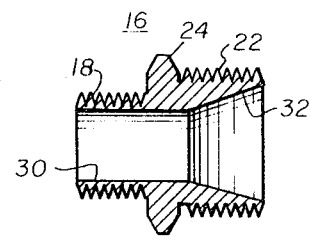
FIG. 2 is a side elevation, in section, of the body member of FIG. 1.

Turning now to FIG. 2 the internal details of the body member 16 may be appreciated. A longitudinal passage 30 passes through the entire body member 16 and is outwardly tapered as at 32 in the portion of the body member 16 having the second external thread portion 22.

Figure 3:
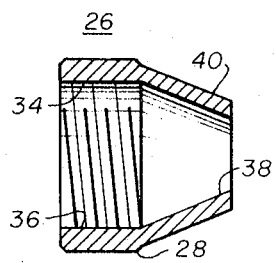
FIG. 3 is a side elevation, in section, of the gland nut of FIG. 1.

As is seen in FIG. 3, the gland nut 26 has an internally threaded portion 34 in that portion of the gland nut 26 whose external surface is knurled as at 28. Internally threaded portion 34 of the gland nut 26 is made to engage the second externally threaded portion 22 of the body member 16. A longitudinal passage 36 extends through the gland nut 26 and is inwardly tapered as at 38 within the inwardly tapered portion 40.

Figure 6:
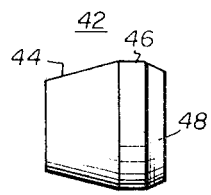
FIG. 6 is a side elevational view of the bushing employed in the connector of FIG. 1.

Positioned within the body member 16 is a bushing 42 as is seen in FIG. 6, the bushing 42 having a longitudinal passage therethrough (not shown in FIG. 6). A first portion 44 of the bushing 42 has a tapered outer surface complementally tapered with the taper 32 of the body member 16. A second portion 46 of the outer surface of the bushing 42 is cylindrical to provide, as will be described below, spacing between the conductor grip means and the body member 16. Finally, a tapered portion 48 is provided at the extreme end of the bushing 42 complementary with the taper 38 of the gland nut 26. As will be described below in greater detail, the forceful engagement of the tapered surface 44 of the bushing 42 with the tapered surface 32 of the body member 16 and of the tapered portion 48 with the tapered portion 38 of the gland nut 26 during assembly of the gland nut 26 to the body member 16 will cause deforming of the bushing 42 to provide the desired moisture seal within the connector 10.

Figure 4:
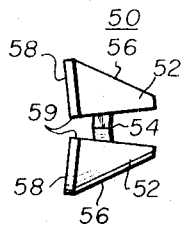
FIG. 4 is a side elevation of one embodiment of a conductor gripping means which may be employed with the connector of FIG. 1.
Figure 5:
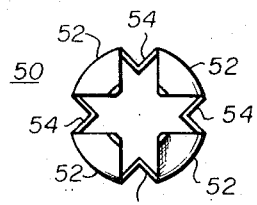
FIG. 5 is a front elevational view of the conductor gripping means of FIG. 4.
Figure 9:
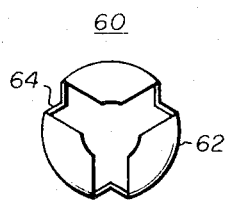
FIG. 9 is a front elevation of a further embodiment of a conductor gripping means for use with the connector of FIG. 1.
Figure 10:
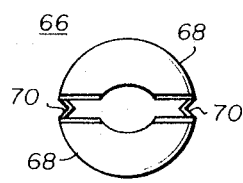
FIG. 10 is a front elevation of yet another embodiment of the conductor gripping means.

Turning now to FIGS. 4 and 5 there is shown the conductor gripping means 50 provided to grasp the electrical conductor placed through the connector 10 and provide strain relief for such conductor. Conductor gripping means 50 is composed of four segments 52. The conductor grip means may also be constructed, as is shown in FIG. 9, of three segments 62 joined by webs 64 to form conductor gripping means 60 or may be constructed of two segments 68 as is shown by conductor gripping means 66 of FIG. 10. The two segments 68 are joined by webs 70.

Turning again to FIGS. 4 and 5 the segments 52 are joined by means of corrugated webs 54. The external surface of the segments 52 are tapered as at 56 to match the taper 38 of the gland nut 26. As will be described below with respect to FIGS. 7 and 8 the surface 58 of the segments 52 will be in contact with the surface of the bushing 42 adjacent the tapered portion 48 thereof and the tapered portions 56 of the segments 52 will be in contact with the tapered portion 38 of the gland nut 26. Upon assembly of the gland nut 26 to the body member 16 the segments 52 will be forced towards the center of the conductor gripping means 50 closing about the conductor placed therethrough.

As is better appreciated in FIG. 5, each of the web means 54 are corrugated inwardly such that upon the application of the assembly force the web portions 54 will tend to fold inwardly as the segments 52 grasp the conductor. Similarly, when the gland nut 26 is disassembled from the body member 16 the assembly force between the bushing 42 and the conductor grip means 50 is removed permitting the web means 54 to cause the segments 52 to open outwardly thereby releasing the conductor gripping means 50 from the conductor. It should be noted that there are web means 54 between each of the four segments 52. This would require that a conductor be inserted through the central opening between the segments 52. However, if desired, one of the web means 54 may be omitted such that the conductor grip means 50 may be inserted about the conductor without requiring the conductor to be threaded through the conductor gripping means 50. It should also be noted, with respect to FIG. 4, that the edges 59 at the rear surface 50 of the segments 52 are positioned closer to one another than the edges at the opposite end of the segments 52. This position is accomplished by the positioning of the webs 54 which cause the edges 59 to be closer towards one another than the corresponding edges at the other end of the segments 52. As will be explained later, this initital position of edges 59 of the segments 52 has a tendency to cause these edges 59 to bite into the conductor first during assembly and should any effort be made to withdraw the conductor or to place strain upon the conductor while the conductor is assembled with the connector 10, edges 59 will tend to bite harder into the conductor and thereby provide maximum strain relief for the conductor 12.

Figure 7:
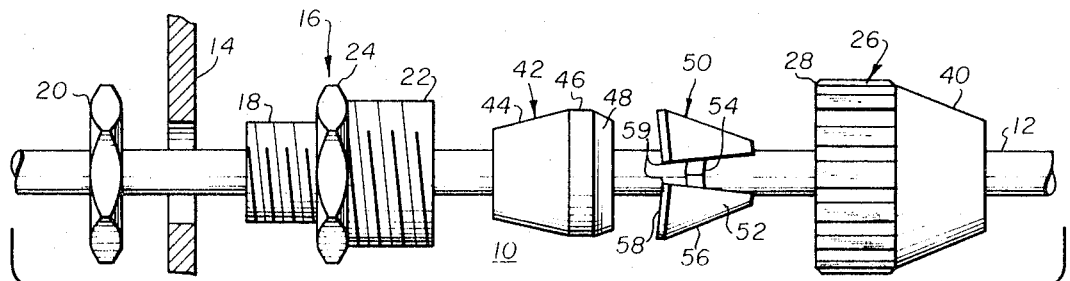
FIG. 7 is the connector of FIG. 1 in exploded form.

Turning now to FIG. 7, there is shown an exploded view of the connector 10 of FIG. 1 so that the manner of assembly of the various components may be better appreciated. Firstly, the body member 16 is passed through the knockout of an electrical enclosure wall 14 by inserting the first externally threaded portion 18 through the knockout and engaging same by threaded fastener such as the nut 20. This will effectively lock the connector 10 to the enclosure wall 14. Then the bushing 42 is inserted so that its tapered portion 44 will engage the tapered portion 32 of the body member 16 as was described above with respect to FIG. 2. Next, conductor grip means 50 is assembled so that surface 58 is in contact with the portion of the bushing 42 adjacent the tapered edge 48. Finally, the gland nut 26 is applied to press the bushing 42 within the body member 16 and the conductor grip means 50 within the gland nut, and assembling the internally threaded portion 34 of the gland nut 26 to the externally threaded portion 22 of the body member 16 as was described above with respect to FIG. 3. The assembly of connector 10 is loosely made so that the conductor 12 can now be passed through the component parts of connector 10 into the enclosure. It may then be tightened by hand or tools may be employed. Also, the gland nut 26, conductor gripping means 50 and bushing 42 may be placed over the conductor 12 prior to assembly to the body member 16 already anchored to enclosure wall 14.

Figure 8:
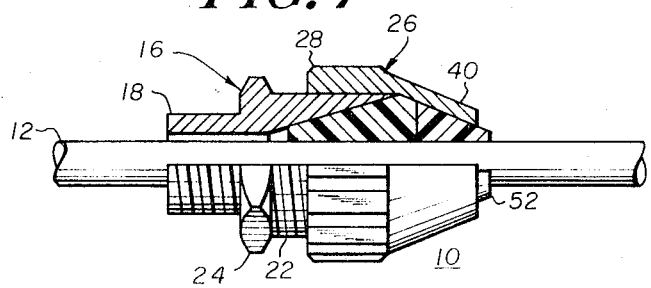
FIG. 8 is a side elevation, partially in section, showing the manner in which the components of the connector of FIG. 1 appear when the connector has been applied to a conductor.

As the gland nut 26 is tightened upon the body member 16, as is shown in FIG. 8, the following will occur. The segments 52 of the conductor grip means 50 will be forced within the tapered portion 38 of the gland nut 26 to contact the conductor 12 placed therein. Due to the manner in which the segments 52 are coupled together by means of the webs 54, edges 59 of the segments 52 will tend to engage the conductor 12 first tending to dig into the insulation of the conductor. Further, the tapered portion 44 of the bushing 42 will follow along the inwardly tapered portion 32 of the body member 16 and provide a seal. Continued tightening of the gland nut 26 to the body member 16 will cause more even gripping of the conductor 12 by the segments 52 of the conductor gripping means 50. Also the inclined surfaces of the segments 52 in contact with the tapered portion 38 of gland nut 36 and the segments 52 with the conductor 12 will apply a force to the surface of the bushing 42 adjacent tapered portion 48. This force at one end, plus the forced produced by the engagement of the tapered portion 44 of the bushing 42 as it seats itself against the outwardly tapered portion 32 of the body member 16 causes deformation of the bushing 42 so as to provide a moisture seal between the body member 16 and the gland nut 26 and also between the conductor gripping means 50 and the gland nut 26. The cylindrical portion 46 of the bushing 42 will tend to prevent over-tightening of the gland nut 26 to the body member 16 and thereby will prevent the destruction of the conductor 12. It should be noted that tips of the segments 52 of the conductor grip means 50 have exited from the end of the tapered portion 40 of the gland nut 26 to grip portions of the conductor 12 outside of the connector 10. The degree of exit of the segments 52 from the gland nut 26 will be dependent upon the size of the conductor 12 and thus the connector 10 is able to handle a wider range of conductor diameters than would be possible should the segments 52 be retained totally within the connector 10.

The embodiments of the invention in which the exclusive property or privileges claimed are defined as follows:

1. A liquid tight strain relief connector for coupling an electrical conductor to an electrical enclosure comprising: a body member having a first end and a second end and a longitudinal passage therethrough from said first end to said second end; said body member having a first externally threaded portion adjacent said first end; said longitudinal passage of said body member being outwardly tapered adjacent said first end of said body member; a bushing having a longitudinal passage therethrough from a first end to a second end; a complementary taper on the outer surface of said bushing adjacent said first end of said bushing; said tapered outer surface of said bushing adjacent said first end of said bushing mating with said outwardly tapered portion of said longitudinal passage of said body member; a gland nut having a longitudinal passage from a first end to a second end; said longitudinal passage of said gland nut inwardly tapered adjacent said first end of said gland nut; said gland nut internally threaded adjacent said second end thereof to threadably engage said first externally threaded portion of said body member; said bushing having an additional taper on the outer surface thereof adjacent said second end of said bushing complementary with the taper of said longitudinal passage of said gland nut; conductor grip means having at least two segments arranged to grasp a conductor placed therebetween; each of said segments having a taper from a first end to a second end thereof, the taper of said segments being complementary to the taper of said longitudinal passage of said gland nut; the angles of taper of said additional taper of said bushing, said inward taper of said longitudinal passage of said gland nut and said taper of said segments being generally similar; said segments of said conductor grip means being coupled by at least one web; each of said webs being corrrugated to permit said segments to tighten about a conductor placed in said connector as said connector is assembled and to move from a conductor placed in said connector as said connector is disassembled whereby the assembly of said gland nut to said body member causes the segments of said conductor grip means to grasp a conductor placed in said connector and said bushing to deform to provide a liquid tight seal about a conductor placed in said connector.

2. A connector as defined in claim 1, wherein said body member has a second externally threaded portion adjacent said second end for insertion in the knockout of an electrical enclosure; a fastening means threadably engageable with said second externally threaded portion to fasten said conductor to said electrical enclosure.

3. A connector as defined in claim 2, wherein said body member further comprises a plurality of wrench flats about the outer surface of body member intermediate said first and second externally threaded portions.

4. A connector as defined in claim 1, wherein the external surface of said gland nut adjacent said second end is knurled.

5. A connector as defined in claim 1, wherein said conductor grip means has three segments, at least two of which are coupled by webs.

6. A connector as defined in claim 1, wherein said conductor grip means has four segments, at least three of which are coupled by webs.

7. A connector as defined in claim 1, wherein the segments of said conductor grip means are coupled by webs positioning said second ends of said segments closer together than said first ends whereby said second ends of said segments of said conductor grip means are caused to engage said conductor first as said connector is assembled.

References Cited

UNITED STATES PATENTS

| 3,567,843 | 3/1971 | Collins et al. | 285—161 X |
| 2,779,610 | 1/1957 | Risley | 285—348 X |
| 3,401,959 | 9/1968 | Reiss et al. | 285—348 X |
| 1,885,779 | 11/1932 | Stewart | 285—343 X |
| 3,056,852 | 10/1962 | Sachs | 174—153 G |
| 3,150,886 | 9/1964 | Briegel et al. | 285—161 |

FOREIGN PATENTS

| 685,003 | 12/1952 | Great Britain | 174—65.1 |
| 1,475,764 | 3/1969 | Germany | 285—341 |

THOMAS F. CALLAGHAN, Primary Examiner

U.S. Cl. X.R.

174—65 SS; 285—341, 348